(12) United States Patent
Clark et al.

(10) Patent No.: US 10,536,416 B2
(45) Date of Patent: *Jan. 14, 2020

(54) INTELLIGENT MESSAGE QUEUE MANAGEMENT

(71) Applicant: INTERNATIONAL BUSINESS MACHINES CORPORATION, Armonk, NY (US)

(72) Inventors: Adam C. Clark, Hursley (GB); Thomas W. Leend, Hursley (GB); Hitesh Tailor, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/952,522

(22) Filed: Apr. 13, 2018

(65) Prior Publication Data

US 2018/0234379 A1 Aug. 16, 2018

Related U.S. Application Data

(63) Continuation of application No. 14/938,162, filed on Nov. 11, 2015, now Pat. No. 9,998,418.

(51) Int. Cl.
*H04L 12/58* (2006.01)
(52) U.S. Cl.
CPC .............. *H04L 51/26* (2013.01); *H04L 51/30* (2013.01)
(58) Field of Classification Search
CPC .................................. H04L 51/26; H04L 51/30
See application file for complete search history.

(56) References Cited

U.S. PATENT DOCUMENTS

| 7,117,214 | B2 | 10/2006 | Wiser et al. |
| 7,349,980 | B1 * | 3/2008 | Darugar .................. H04L 67/02 709/238 |
| 7,352,762 | B2 | 4/2008 | Tv et al. |
| 7,356,532 | B2 | 4/2008 | Wiser et al. |
| 7,624,144 | B1 | 11/2009 | Mitrov |

(Continued)

OTHER PUBLICATIONS

List of IBM Patents or Patent Applications Treated as Related; Date Filed: Apr. 13, 2018, 2 pages.

(Continued)

*Primary Examiner* — Blake J Rubin
(74) *Attorney, Agent, or Firm* — Cantor Colburn LLP; Alexander Jochym (57) ABSTRACT

Aspects include managing distribution of messages from a message queue to a plurality of consumers for processing by maintaining a processing history for the messages in the message queue. The processing history identifies each message in the message queue by a message identifier and consumers having previously failed to successfully process a message in the message queue having the message identifier. Aspects also include considering the suitability of a particular consumer to receive a next message to be processed from the message queue by determining the message identifier of the next message and the consumer identifier of the particular consumer. Aspects further include distributing the next message to be processed to the particular consumer if the consumer identifier of the particular consumer is not present in the checked set of consumer identifiers.

20 Claims, 5 Drawing Sheets

(56) References Cited

U.S. PATENT DOCUMENTS

| | | | |
|---|---|---|---|
| 7,624,308 B2 | 11/2009 | Critchley et al. | |
| 8,200,765 B2 | 6/2012 | Bittles et al. | |
| 8,504,872 B1 | 8/2013 | Watson et al. | |
| 9,231,995 B2 | 1/2016 | Junnarkar et al. | |
| 9,436,532 B1* | 9/2016 | Chandrasekaran | G06F 9/546 |
| 2008/0229329 A1 | 9/2008 | Ayres et al. | |
| 2009/0055511 A1 | 2/2009 | Berry et al. | |
| 2010/0095308 A1* | 4/2010 | Blue | G06F 9/546 |
| | | | 719/314 |
| 2012/0167162 A1* | 6/2012 | Raleigh | G06F 21/57 |
| | | | 726/1 |
| 2013/0086154 A1 | 4/2013 | Junnarkar et al. | |
| 2014/0233620 A1* | 8/2014 | Bernheim | H04B 3/54 |
| | | | 375/224 |
| 2015/0046541 A1* | 2/2015 | Kang | H04L 45/28 |
| | | | 709/206 |
| 2016/0019608 A1* | 1/2016 | Smith | G06Q 30/0281 |
| | | | 705/346 |
| 2016/0094625 A1* | 3/2016 | Sengodan | H04L 67/10 |
| | | | 709/204 |
| 2016/0134573 A1* | 5/2016 | Gagliardi | H04L 51/26 |
| 2017/0134330 A1 | 5/2017 | Clark et al. | |
| 2017/0207916 A1* | 7/2017 | Luce | H04L 9/14 |

OTHER PUBLICATIONS

IBM Software Group "IBM WebSphere Application Server V7 MBeans for JCA message endpoints", updated Sep. 19, 2008; ftp://ftp.software.ibm.com/software/iea/content/com.ibm.iea.was_v7/was/7.0/Administration/WASv7_MBeansforJCAMessageEndpoints.pdf; 7 pgs.

* cited by examiner

INTELLIGENT MESSAGE QUEUE MANAGEMENT

DOMESTIC PRIORITY

This application is a continuation of U.S. application Ser. No. 14/938,162, titled "INTELLIGENT MESSAGE QUEUE MANAGEMENT" filed Nov. 11, 2015, the contents of which are incorporated by reference herein in its entirety.

BACKGROUND

Embodiments of the present invention are concerned with providing a computer-implemented method, a computer program product and a computer system that facilitate message queue management.

An electronic message refers to any type of data structure exchanged between two parties (e.g., two hardware parties, two software parties, a hardware and software party, etc.) via an electronic communication. The electronic message includes, but is not limited to, an e-mail, an instant message, an audio message, a text message and a facsimile message. In the following, such an electronic message will be simply referred to as a message. The parties involved in the communication of such messages may be referred to as publishers and consumers, with the publisher being a computer device or application running thereon producing such a message and a consumer being a computer device or application running thereon consuming such a message.

Message consumption by a consumer may require the consumer to process the message, for example when the publisher requires a response to the message. This for instance may be the case if the message contains a request for a service or the like in which case the consumer may be the provider of the service or the like. In an environment where a consumer may receive a large number of messages, an intermediary such as a message queue manager may be used to distribute messages received from a number of publishers across a number of consumers in order to ensure that the messages are processed in a timely fashion.

Many implementations of such intermediaries and consumers exist. A non-limiting example of such an implementation is the Java® Message Service (JMS). One of key elements of Java Message Service (JMS) is message-driven beans (MDBs). The JMS is a messaging standard that allows applications based on Java® software technology to create, send, receive and read electronic messages. The JMS enables distributed, loosely coupled, reliable and asynchronous communication between an electronic message publisher (i.e., a computing device generating an electronic message) and an electronic message subscriber (i.e., a computing device receiving the electronic message). MDBs are a component that allows Java® applications to process electronic messages asynchronously. MDBs act as a JMS message listener, which is similar to an event listener/detector except it receives electronic messages instead of events. MDBs monitor a queue receiving electronic messages. When an electronic message arrives at the queue, an instance of the MDB is invoked asynchronously to process the electronic message. The MDB instance may refer to one or more threads executing the MDB.

As explained above, it is possible to have multiple instances of a consumer processing electronic messages concurrently. Such instances may be embodied within a single server or may be distributed across different geographical locations for redundancy reasons, e.g. in order to mitigate the risk of delays to the processing of messages from the queue caused by one or more of the instances (consumers) being unable to successfully process a message, for example because the instance or consumer requires access to a remote resource such as a database that is temporarily unavailable, for example because of remote resource maintenance, the remote resource being down or a network connection to the remote resource being temporarily unavailable.

It is difficult to avoid messages being returned, i.e. rolled back, to the message queue by a consumer incapable of successfully processing the message, as the consumer may be simply unable for reasons beyond its control to successfully process the message as explained above. In such a scenario, the intermediary acting as queue manager simply redistributes the message to one of the consumers. However, if the message or other messages are redistributed to the consumer that returned the unsuccessfully processed message to the message queue, an accumulation of messages that have been unsuccessfully processed by a consumer may occur in the message queue. This can have a negative impact on message throughput for the message queue.

SUMMARY

Embodiments of the present invention seek to provide a computer-implemented method, computer program product and computer system that can avoid excessive accumulation of previously unsuccessfully processed messages in a message queue.

According to an aspect, there is provided a computer-implemented method of managing distribution of messages from a message queue to a plurality of consumers for processing the messages, the method comprising maintaining a processing history for the messages in the message queue, the processing history identifying each message in the message queue by a message identifier, the processing history further comprising, for each message identifier, a set of consumer identifiers identifying consumers having previously failed to successfully process a message in the message queue having the message identifier; considering the suitability of a particular consumer to receive a next message to be processed from the message queue by determining the message identifier of the next message and the consumer identifier of the particular consumer; and checking the set of consumer identifiers for the message identifier of the next message in the processing history to determine if the checked set of consumer identifiers contains the determined consumer identifier of the particular consumer; and distributing the next message to be processed to the particular consumer if the consumer identifier of the particular consumer is not present in the checked set of consumer identifiers.

According to another aspect, there is provided a computer program product comprising a computer readable storage medium having computer readable program instructions embodied therewith for, when executed on a computer system comprising a processor arrangement adapted to execute the computer readable program instructions, cause the processor arrangement to execute the above computer-implemented method According to yet another aspect, there is provided a computer system for of managing distribution of messages from a message queue to a plurality of consumers for processing the messages, the computer system comprising a processor arrangement communicatively coupled to a computer readable storage medium embodying the above computer program product, wherein the processor arrangement is adapted, when executing the computer readable program instructions of the computer program product, to maintain a processing history for the messages in the message queue, the processing history identifying each message in the message queue by a message identifier, the processing history further comprising, for each message identifier, a set of consumer identifiers identifying consumers having previously failed to successfully process a message in the message queue having the message identifier; consider the suitability of a particular consumer to receive a next message to be processed from the message queue by determining the message identifier of the next message and the consumer identifier of the particular consumer; and checking the set of consumer identifiers for the message identifier of the next message in the processing history to determine if the checked set of consumer identifiers contains the determined consumer identifier of the particular consumer; and distribute the next message to be processed to the particular consumer if the consumer identifier of the particular consumer is not present in the checked set of consumer identifiers.

BRIEF DESCRIPTION OF THE DRAWINGS

Exemplary embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

In the context of the present application, where reference is made to processing a message, this refers to doing work related to the electronic message itself, e.g., handling of the electronic message by a consumer application. Once this work has been completed successfully by a consumer of the message, the message is considered successfully processed. Successfully processed refers to finalizing the work and any changes that may have occurred, so that the changes are affirmed and cannot be canceled. For example, one electronic message delivered to an MDB might contain an order for a book. The "processing" of this message would involve checking stock levels in a database, decrementing a stock counter, printing out an address label and taking payment from a buyer's bank account. If anything goes wrong during any of these steps, all the works (i.e., all the processing) can be "rolled back" to a previous state (i.e., a state before starting to process the electronic message) and the electronic message is returned to its original location such as to a message queue. "Rolling back an electronic message" refers to cancelling all the works that has been made while processing the electronic message and returning to a previous state, which is a state before starting to execute the electronic message. If all the steps e.g., from checking stock levels to taking payment from a buyer's account, complete successfully, then the processed message is "successfully processed" and all the changes made while processing the electronic message is confirmed.

Where a message is rolled back and returned to any suitable location within the message queue, such as to the top of the message queue or to the bottom of the message queue depending on the management policy applied to the message queue, the message is typically redistributed to one of the consumers of messages, e.g. an application server or the like. An application server may refer to a server that hosts an API (Application Programming Interface) to execute a logic or process used by other applications. Examples of application servers include, but are not limited to: IBM® WebSphere® Application Server, WebLogic® Server from Oracle®, Apache Geronimo™ from Apache Software Foundation, and so on. IBM and WebSphere are trademarks of International Business Machines Corporation, registered in many jurisdictions worldwide. Oracle, Java and all Java-based trademarks and logos are trademarks or registered trademarks of Oracle and/or its affiliates. Apache, Apache Geronimo are either registered trademarks or trademarks of the Apache Software Foundation in the United States and/or other countries.

If the message is repeatedly reissued to the same consumer, this can cause the message to be repeatedly returned to the message queue, for example if the consumer cannot access a remote resource such as a remote database in order to successfully process the message issued to the consumer. This may cause accumulation of rolled back messages in the message queue, which problem may be amplified if multiple messages are being distributed and subsequently returned to the message queue by some of the consumers.

Embodiments of the present invention seek to prevent or at least reduce the repeated returning of messages to the message queue by maintaining a processing history for the messages in the message queue, which processing history identifies the one or more consumers that previously returned the message to the message queue after the unsuccessful processing of the message, which processing history may be used to distribute the messages to consumers that have not yet failed to successfully process the messages or have failed to successfully process the messages fewer than a predetermined number of times, i.e. below a predetermined failure threshold. This reduces the risk of excessive message dwell time in the message queue, thereby improving message throughput.

Figure 1:
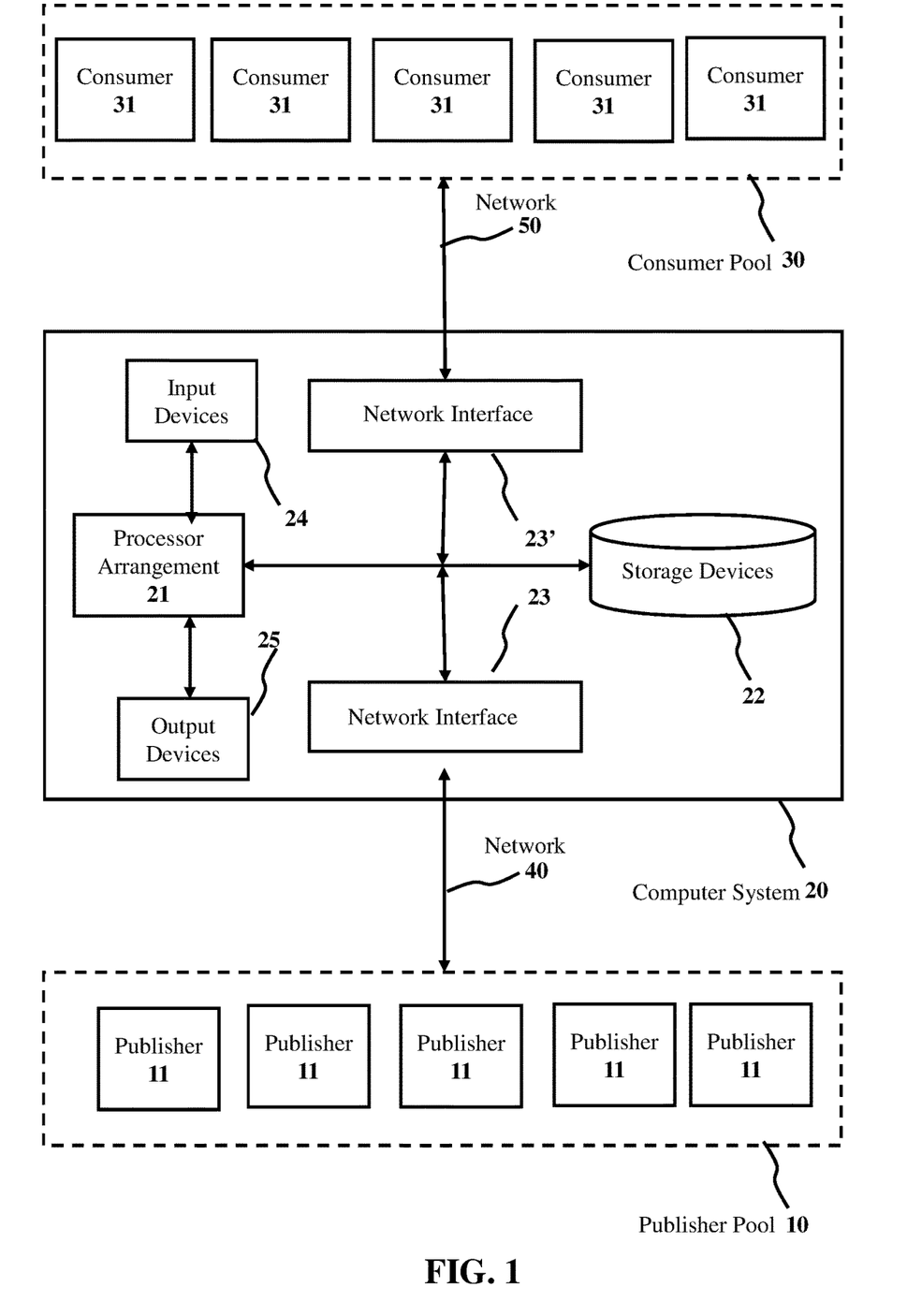
FIG. 1 schematically depicts a computer system according to an embodiment.
Figure 2:
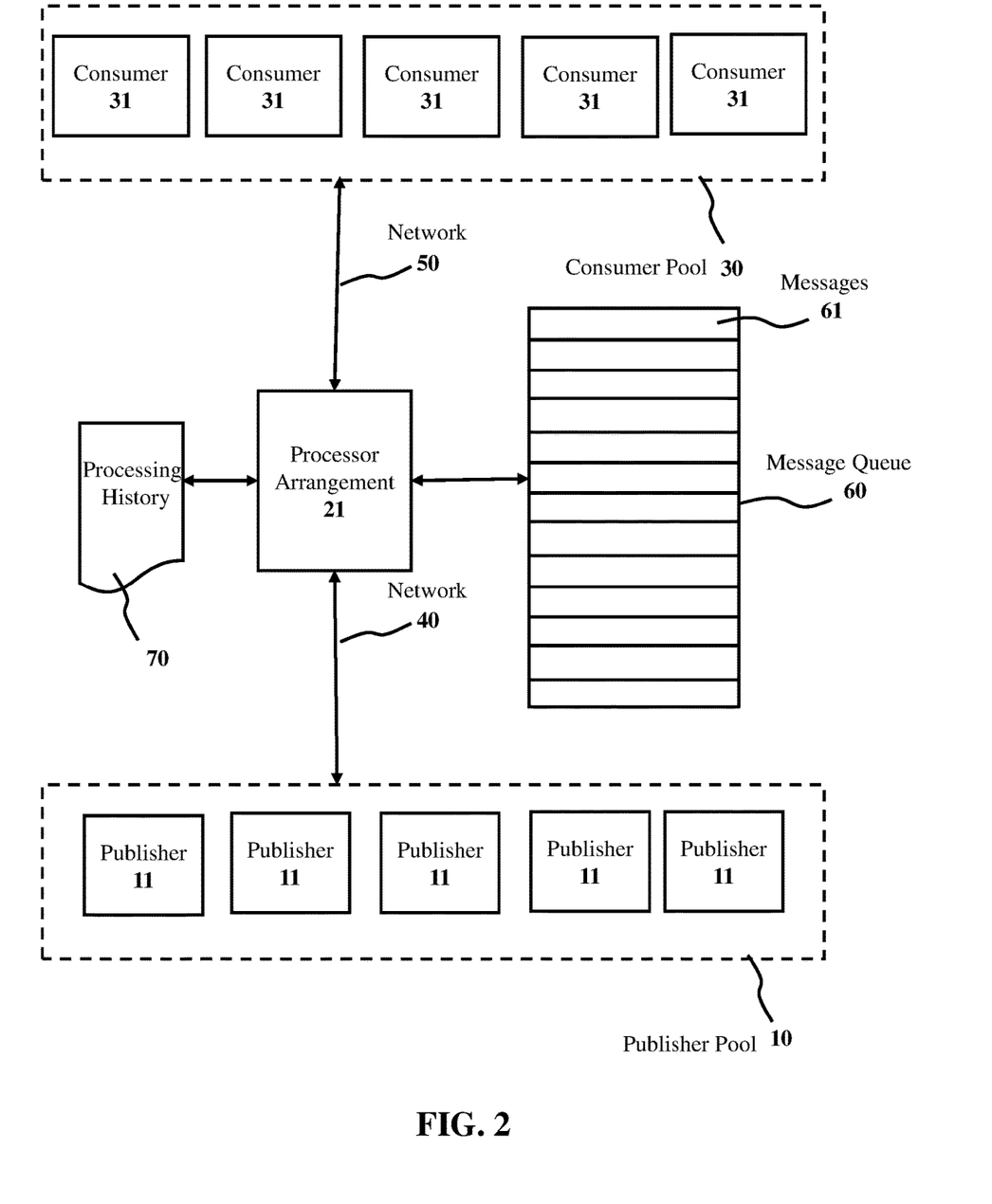
FIG. 2 schematically depicts functionality implemented by a computer system according to an embodiment.

FIG. 1 schematically depicts a message processing architecture including a computer system according to an embodiment and FIG. 2 schematically depicts the functionality implemented by the computer system according to an embodiment, which figures will be described together below.

The message processing architecture including a computer system 20 according to an embodiment comprises a pool 10 of message publishers 11, in which each publisher 11 may be any suitable computing device configured to generate such messages, e.g. a portable desktop computer, a smart portable device such as a smart phone or tablet computer, a client server, and so on. Message publishers 11 typically publish messages for processing by a consumer 31 from the pool 30 of consumers, which published messages are collected by the computer system 20 acting as a queue manager implementing a message queue 60 of messages 61 received from the pool 10 of message publishers 11.

The message publishers 11 may communicate the messages 61 to the computer system 20 over a network 40, which may be any suitable network, e.g. wired networks such as a LAN or the Internet, wireless networks such as mobile communication networks, Wi-Fi networks, and so on. The computer system 20 typically comprises a processor arrangement 21, which may comprise any suitable number and type of processors, e.g. multi-purpose processors, application-specific processors such as ASICs, and so on, which may be communicatively coupled to the network 40 via any suitable network interface 23. The computer system 20 acting as a queue manager of the message queue 60 may relay or distribute messages 61 from the message queue 60 to selected consumers 31 over a further network 50, which may be the same network or a different network to the network 40. The further network 50 may be any suitable network, e.g. wired networks such as a LAN or the Internet, wireless networks such as mobile communication networks, Wi-Fi networks, and so on. The processor arrangement 21 may be communicatively coupled to the further network 50 via a further network interface 23', which may be the same network interface as a network interface 23 or may be a different network interface.

The computer system 20 further comprises one or more data storage devices 22 (here symbolized by a single device by way of non-limiting examples only), which data storage devices 22 may be any suitable data storage device such as a read-only memory, a random access memory, a Flash memory, a solid state disk or disk array, an optical disc or disk array, a magnetic disk or disk array, which some of the data storage devices being connected to the computer system 20 via a network or cable, e.g. in the case of network-attached storage, storage area networks, cloud storage, and so on. Any suitable combination of such well-known data storage devices 22 may form part of the computer system 20.

The computer system 20 may further comprise one or more input devices 24, e.g. a keyboard, mouse, voice recognition module, touchscreen, and so on and may further comprise one or more output devices 25, e.g. a display device such as a computer monitor, an audio output device, a printing device, and so on. The computer system 20 may take any suitable shape, for example may comprise one or more computers acting as servers, each computer may be individually one of a network server, an application server, or a blade server and so on. Two or more networked servers may share in the execution of at least portions of a same application, program, function, or other assemblage of programmable and executable code.

In at least some embodiments, the data storage device 22 may store computer readable program instructions for, when executed on the processor arrangement 21 adapted to execute the computer readable program instructions, cause the processor arrangement 21 to execute one or more embodiments of the computer-implemented method that will be described in more detail below.

In some embodiments, at least some consumers 31 from the pool 30 of consumers 31 may form part of the computer system 20. The consumers 31 may be hosted by the computer system 20; alternatively, the consumers 31 may be hosted by separate computers of a computer system 20, which separate computers may be located in geographically distinct locations for redundancy reasons.

The processor arrangement 21 according to embodiments of the present invention is adapted to maintain a processing history 70 of the messages 61 in the message queue 60. The processing history 70 may contain information such as message identifiers of the messages 61, which information may be mapped to sets of consumers 31 that have previously failed to successfully process such a message. Such sets may contain consumer identifiers that allow the processor arrangement 21 to identify the consumers 31 that previously returned a message 61 to the message queue 60 following the unsuccessful processing of the message 61 and its subsequent rollback. For at least some of the messages 61 in the message queue 60, the associated set of consumer identifiers may be empty, thereby indicating that the particular message 61 associated with such an empty set has not been previously returned to the message queue 60.

The processing history 70 may take any suitable form. For example, the processing history 70 may at least in part be embodied by a mapping table mapping message identifiers to one or more consumer identifiers identifying consumers 31 that have previously returned the mapped message 61 to the message queue 60 following unsuccessful processing of the mapped message 61. Such a mapping table may be stored by the computer system 20 in a data storage device 22 such as a random access memory associated with the processor arrangement 21 or indeed any other suitable data storage device 22. Alternatively, each message 61 may contain metadata including a message identifier and a set of consumer identifiers of consumers 31 having previously unsuccessfully attempted to process the message 61 prior to returning the message 61 to the message queue 60. Other suitable embodiments of the processing history 70 will be immediately apparent to the skilled person, and it is expressly noted that any suitable implementation of the processing history 70 may be used without departing from the teachings of the present invention.

In some embodiments, the computer system 20 may further maintain evaluation data of the performance of the consumers 31 in the pool 30 of consumers 31, specifically information pertaining to the message returning behavior of the consumers 31. For example, the computer system 20 acting as a queue manager may maintain a processing failure counter for each consumer 31 to decide if the consumer 31 should receive messages 61 from the message queue 60. Such a counter may form part of the processing history 70 or may be kept separately from the processing history 70 by the computer system 20, e.g. may be stored separately in a data storage device 22.

The evaluation data of the performance of consumers 31 may further comprise an evaluation of the message processing success rate of a consumer 31 adapted to consume a plurality of messages 61 in parallel, i.e. at the same time. For example, a consumer 31 may be hosted by a server hosting a plurality of instances of a consumer application, e.g. a number N of such consumer applications, with N being an integer larger than 1, such as larger than 10, 20, 30, 40 or 50. However, not all messages process in parallel may be successfully processed, for example where a remote resource such as a remote database temporarily has a reduced bandwidth, e.g. due to database maintenance, in which case only M messages may be successfully processed by the consumer 31, with M<N.

The computer system 20 for instance may monitor how many of the N messages 61 simultaneously distributed to the consumer 31 are returned to the message queue 60 by the consumer 31, which metric may be used by the computer system 20 to decide how many messages 61 may be issued to the consumer 31 next time around. For example, the computer system 20 may decide to issue no more than M messages 61 from the message queue 60 to the multi-message consumer 31 or to issue only a fraction of the number of messages 61 requested by the multi-message consumer 31 to the multi-message consumer 31 based on the determined metric, such as a fraction M/N, with the computer system 20 issuing M/N*Q messages 61 to the multi-message consumer 31, where Q is the number of messages 61 requested by the multi-message consumer 31. The computer system 20 may periodically alter (e.g. increase) this fraction and continue to monitor the performance of the affected consumer 31 with the aim of returning the consumer 31 to full capacity if the consumer 31 regains its full capacity for successfully handling messages 61. For example, where the multi-message consumer 31 has demonstrated a minimum success rate for handling a number of messages in parallel over a defined period in time, the computer system 20 may increase the number of messages simultaneously issued to the consumer 31 and monitor the handling success rate of the consumer 31 for the increased number of messages over a defined period in time. This process may be continued and repeated until the multi-message consumer has reached its full capacity, i.e. the computer system 20 has determined that the multi-message consumer 31 is capable of handling N messages simultaneously. Similarly, if after a monitoring period it is determined for the multi-message consumer 31 based on its message handling success rate that the fraction of messages issued simultaneously to the multi-message consumer 31 is appropriate or too high, the fraction may be kept constant or downwardly adjusted accordingly after such a monitoring period. In this manner, the computer system 20 may dynamically monitor the performance i.e. message handling success rate, such multi-message consumers such that the number of messages simultaneously issued to such consumers can be dynamically adjusted based on (changes in) their performance.

Figure 3:
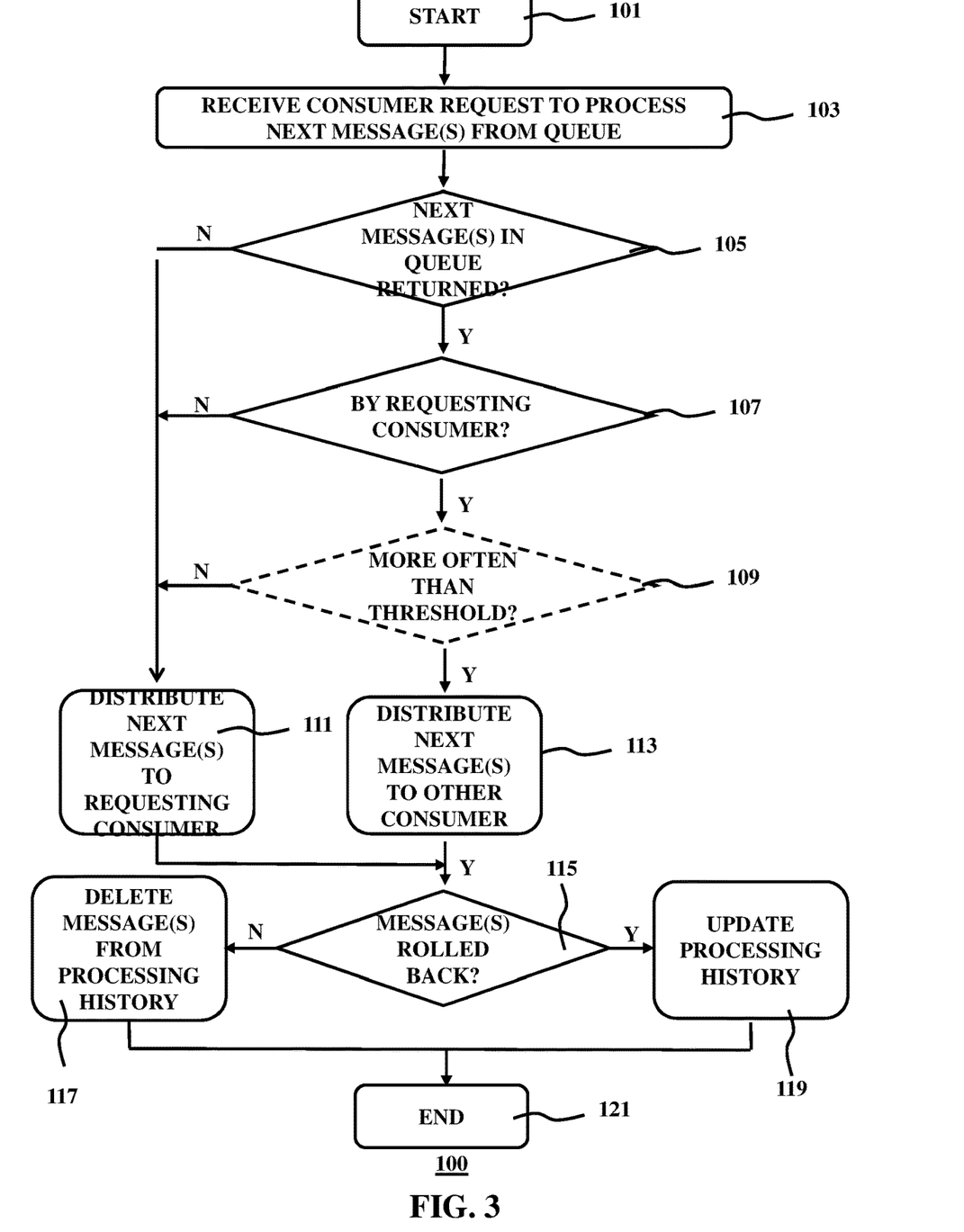
FIG. 3 schematically depicts an aspect of a computer-implemented method according to an embodiment.
Figure 4:
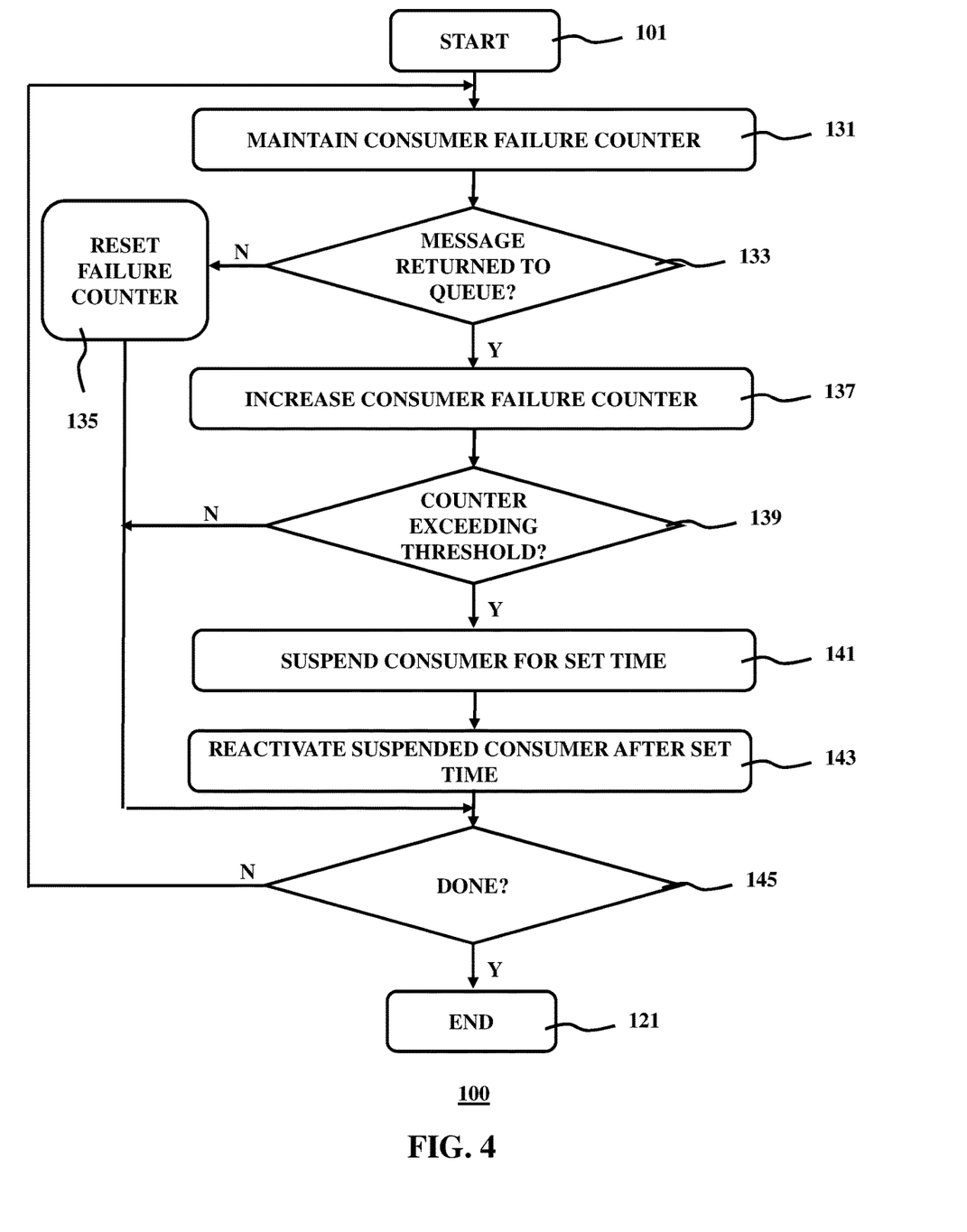
FIG. 4 schematically depicts another aspect of a computer-implemented method according to an embodiment.
Figure 5:
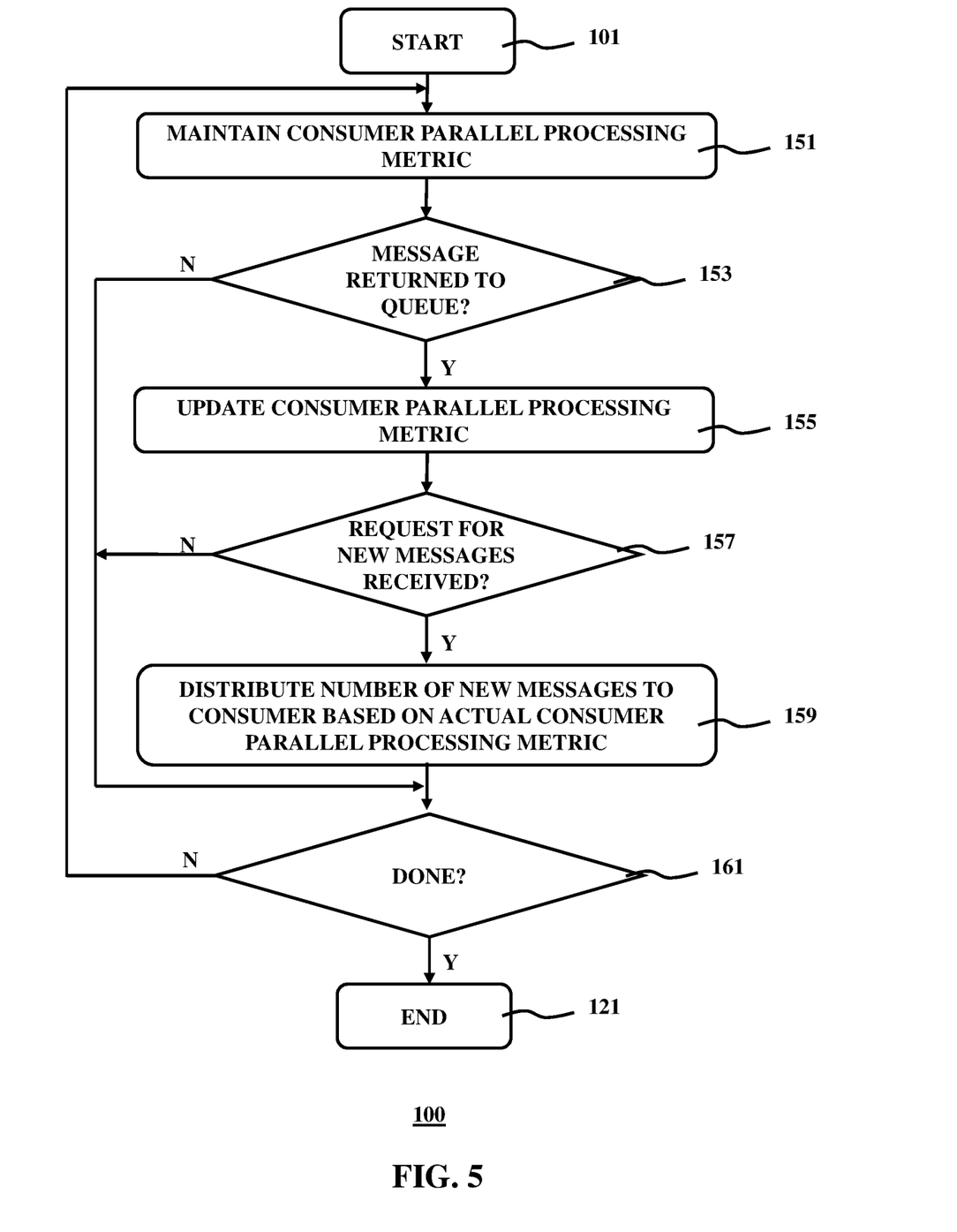
FIG. 5 schematically depicts yet another aspect of a computer-implemented method according to an embodiment.

Example embodiments of the computer-implemented method implemented by the computer system 20 will now be explained in more detail with the aid of FIG. 3-5. FIG. 3 is a flowchart of an aspect of the message queue management method 100 implemented by the computer system 20 acting as a manager of the message queue 60. The computer-implemented method 100 (from here on simply referred to as method 100) commences in 101, for example by initializing the message queue 60 and by receiving one or more messages 61 in the message queue. FIGS. 4-5 depict optional aspects of method 100. The optional aspects as depicted are method parts that can run in parallel with the main embodiment of the method 100 as shown in FIG. 3. In 103, the queue manager implemented by the computer system 20 (from here on simply referred to as queue manager) receives a request from a consumer 31 for one or more messages 61 from the message queue 60, which may be the messages next in line to be processed by one of the consumers 31, such as messages 61 at the front of the message queue 60 or prioritized in any other suitable manner. The messages next in line to be processed by one of the consumers 31 are also referred to as the next messages to be processed.

Following the reception of a request from a consumer 31 for one or more next messages 61 from the message queue 60, the method 100 proceeds to 105 in which the queue manager checks the processing history of the one or more next messages 61 in the message queue 60 to determine if any of these messages 61 has been previously rolled back and returned to the message queue 60 by one of the consumers 31. The queue manager for instance may determine this by looking up the set of consumers mapped to the particular message to determine if the set is empty. If the set is non-empty, i.e. contains one or more consumer identifiers, this indicates that the message has been returned to the message queue 60 at some stage.

Alternatively or additionally, the queue manager may further maintain a processing failure counter for each message 61 in the message queue that is updated every time a message 61 is returned to the message queue 60 by one of the consumers 31 following an unsuccessful processing of the message, in which case the queue manager may determine in 105 that a next message 61 to be processed has been previously returned to the message queue 60 by evaluation of the processing failure counter.

In case a next message 61 to be processed has not been previously returned to the message queue 60, the method 100 may proceed to 111 in which the next message 61 to be processed is distributed from the message queue 60 to the requesting consumer 31 and the message queue 60 is updated accordingly. On the other hand, if it is determined in 105 that a next message 61 has been previously returned to the message queue 60 by one or more consumers 31, the queue manager may subsequently compare in 107 the consumer identifiers of the consumers 31 that have previously returned the message 61 to the message queue 60, with the consumer identifier of the requesting consumer 31. This may for instance be achieved by obtaining the consumer identifier from the requesting consumer 31, e.g. by extracting the consumer identifier from the request for one or more messages 61 from the message queue 60 received from the requesting consumer 31 in 103, by a separate communication between the queue manager and the requesting consumer 31 to obtain its consumer identifier or in any other suitable manner, and comparing the thus obtained consumer identifier of the requesting consumer 31 with the consumer identifiers in the set of consumer identifiers associated with the message identifier of the relevant next message to be processed.

In case the requesting consumer 31 has not previously returned the next message 61 to be processed to the message queue 60, the queue manager may again proceed to 111 in which a next message 61 to be processed is distributed from the message queue 60 to the requesting consumer 31 and the message queue 60 is updated accordingly. On the other hand, if the queue manager determines in 107 that the requesting consumer 31 has previously returned the next message 60 to be processed to the message queue 60, i.e. was unable to successfully process this message, the queue manager may proceed to 113 in which the requesting consumer 31 is prevented from receiving the next message 61 to be processed and the next message 61 is instead distributed to the next requesting consumer 31 that has not previously returned this message. In this manner, it is avoided that the same consumer 31 attempts to process the same message 61 numerous times, thus avoiding message congestion in the message queue 60.

In an embodiment, where a requesting consumer 31 has previously returned the next message 61 to be processed to the message queue 60 a limited number of times, e.g. only once or twice, or fewer than four, five or six times for instance, it may be undesirable to exclude the requesting consumer 31 from receiving the next message 61 to be processed, as in such a scenario the inability of the requesting consumer 31 may have been caused by a transient or short-lived problem. To this end, the method 100 may include optional procedure 109, in which the queue manager compares the processing failure counter of the next message 61 to be processed with a predefined message processing failure threshold. If the processing failure counter of the next message 61 to be processed meets or exceeds this predefined message processing failure threshold, the requesting consumer 31 may be precluded from receiving the next message 61 by the queue manager progressing to 113. On the other hand, if the processing failure counter of the next message 61 to be processed falls below this predefined message processing failure threshold, the queue manager may proceed to 111 as previously explained. It is noted that each message 61 in the message queue may have a global or consumer-independent processing failure counter or alternatively may have a plurality of processing failure counters, with each counter being specific to a particular consumer 31, which has the advantage that a more accurate assessment of the processing history of a particular consumer 31 of the particular message 61 can be made.

Once a next message 61 to be processed has been distributed to one of the consumers 31, the queue manager monitors in 115 if the message is returned to the message queue 60. For example, the queue manager may receive two communications, namely a first communication indicative of the successful processing of the message 61 by the consumer 31 to which the message 61 was distributed or by receiving a second communication from the consumer 31 to which the message 61 was distributed requesting that (a rolled-back version of) the message 31 is reintroduced into the message queue 61, which indicates a processing failure of the message 61 by the processing consumer 31.

If the queue manager determines in 115 that a previously distributed message 61 to one of the consumers 31 has been successfully processed by that consumer, the queue manager may proceed to 117 in which the processing history of that particular message is removed from the processing history as the successfully processed message will not return to the messaging queue 60. On the other hand, if the queue manager determines in 115 that a previously distributed message 61 to one of the consumers 31 has been returned to the message queue 60 by that consumer, the queue manager may proceed to 119 in which the processing history of that particular message is updated to reflect the unsuccessful processing of the message 61 by the returning consumer 31. As will be readily understood, the updating of the processing history of that particular message may include adding the consumer identifier of the returning consumer 31 to the set of consumer identifiers associated with the message identifier of the returned message 61 and/or updating the relevant processing failure counter associated with the returned message 61. The queue manager may subsequently terminate in 121.

In an embodiment, the queue manager may receive respective requests from a plurality of particular consumers 31 to receive a next message 61 to be processed from the message queue 30 in 103. In this scenario, in case of a previously returned next message 61 to the message queue 60, the queue manager may determine the respective consumer identifiers of the particular consumers in 107 and check the set of consumer identifiers for the message identifier of the next message 61 in the processing history for each of the determined consumer identifiers to determine if the set of consumer identifiers contains the determined consumer identifier until a first particular consumer identifier is determined that is not present in the set of consumers identifiers of the next message 61 in the processing history. The queue manager may subsequently distribute the next message 61 to be processed to the consumer associated with the first particular consumer identifier in 111.

The queue manager may evaluate such a plurality of requesting consumers 31 in a suitable manner or order. In an embodiment, an ordering may exist in the pool 30 of requesting consumers 31, in which case the queue manager may perform the evaluation in a round-robin fashion although other suitable evaluation strategies may be equally applied.

In the above described embodiments, the message identifier used by the queue manager is an identifier of an individual message 61, but this is not essential. In an alternative embodiment, the message identifier may be a message type identifier such that the queue manager evaluates the processing history of the messages 61 in the message queue 60 based on message type, such that for a next message 61 to be processed of a particular message type, the queue manager may evaluate the processing history of the messages 61 in the message queue 60 to determine if other messages of the same message type as the next message 61 to be processed have been previously returned to the message queue 60 by a particular requesting consumer 31. This may be indicative of that particular requesting consumer 31 being unable to successfully process messages of a particular message type, which information may be used to preclude the requesting consumer 31 from receiving the next message 61 to be processed even if the requesting consumer 31 has not previously attempted to process in that particular individual message, but instead has failed to successfully process messages of the same type as the next message 61 to be processed. Such a decision making process by the queue manager may be based on evaluation of the sets of consumer identifiers associated with other messages in the message queue 61 having the same message type as the next message 61 to be processed and/or by evaluation of the processing failure counter(s) associated with these other messages having the same message type as the next message 61 to be processed as previously explained in more detail above.

According to an embodiment, the queue manager may further maintain a processing history for the consumers 31 as part of the method 100 to monitor the respective message processing success rates of the consumers 31, e.g by maintaining respective consumer failure counters for the consumers 31. An example embodiment is schematically depicted by the flowchart of FIG. 4.

Following the start of the method 100 in 101, the method 100 may proceed to 131 in which the queue manager maintains consumer failure counters for the consumers 31. Upon issuing, i.e. distributing, a next message 61 to be processed, to a particular consumer 31, e.g. in 111 or 113, the queue manager monitors in 133 if the distributed message is successfully processed by the receiving consumer 31 or is returned by the receiving consumer 31 to the message queue 60 following the unsuccessful processing of the next message 61 by the receiving consumer 31.

In case the issued message 61 has been successfully processed by the receiving consumer 31, the queue manager may reset the consumer failure counter of the receiving consumer in 135, as the fact that the receiving consumer 31 has successfully processed the message 61 may be indicative of a previous problem for the receiving consumer 31 precluding the receiving consumer 31 from successfully processing the message no longer exists. In this scenario, the queue manager may subsequently proceed to 145 in which it is decided if the consumer monitoring process is completed, which if this is the case may cause the queue manager to terminate this process, e.g. in 121, otherwise the queue manager may return to 131 to continue maintenance of the consumer failure counters of the respective consumers 31.

On the other hand, in case the issued message 61 has not been successfully processed by the receiving consumer 31 but instead returned to the message queue 61, the queue manager may increase the consumer failure counter of the receiving consumer 31. This may be preceded by identifying the receiving consumer 31, e.g. from a communication received from the receiving consumer 31, from a distribution history identifying the receiving consumer 31 as the most recent processing consumer of the return message 61, and so on. The consumer failure counter may be used by the queue manager to determine if a particular receiving consumer 31 as a consistent problem successfully processing messages 61, for example a number of contiguous processing failures as indicated by the processing failure counter of that particular consumer 31, in which case it may be decided that such a consumer 31 should be temporarily suspended from receiving new messages 61 for processing by that consumer. To this end, the queue manager may compare an updated processing failure counter of a particular consumer 31 with a predetermined processing failure threshold in 139 to determine if the number of contiguous message processing failures by that particular consumer 31 is indicative of a structural or consistent problem with that particular consumer 31.

If the processing failure counter of the particular consumer 31 falls below the predetermined processing failure threshold, the queue manager may proceed to 145 as previously explained. On the other hand, if the processing failure counter of the particular consumer 31 meets or exceeds the predetermined processing failure threshold, the queue manager may decide in 141 to suspend that particular consumer 31 for a predetermined period of time such that the particular consumer 31 may rectify whatever problem prevented that particular consumer from successfully processing messages 61. For example, a lost connection with an external resource such as a database or the like may be restored during the period of suspension, database maintenance limiting the bandwidth of publications with such a database may be completed in that period of time, and so on.

Upon completion of the period of time during which the consumer 31 was suspended, the queue manager may reactivate the suspended consumer 31 in 143 and may decide in 145 to return to 131 to continue monitoring the message processing performance of the reactivated consumer 31. If such continued monitoring is not required, the queue manager may instead decide in 145 to terminate the monitoring process in 121.

In an embodiment, where it is decided during the continued monitoring of a reactivated consumer 31 that this consumer is still unable to successfully process messages 61 on the message queue 60, the reactivated consumer 31 may be suspended again for a second period of time, which is longer than the initial period of time during which the consumer was suspended. This may be useful because the continued inability of the reactivated consumer 31 to successfully process messages 61 may be indicative of a longer suspension period being required for the consumer 31 to rectify whatever problem is preventing the consumer 31 from successfully processing messages 61. Any suitable increase of the second period of suspension time relative to the first period of suspension time may be contemplated. For example, each subsequent period of suspension may be a multiple of the previous period of suspension, e.g. twice as long, three times as long, and so on, but other increases are equally feasible.

In an embodiment, upon reactivation of a previously suspended consumer 31 in 143, the queue manager may start distributing new messages 61 to be processed by the reactivated consumer 31 at a first message distribution rate to determine if the reactivated consumer 31 is capable of coping with a stream of messages 61 received at this first message distribution rate. This first message distribution rate typically is a fraction of the message processing capacity in terms of number of messages per unit of time of the reactivated consumer 31. Upon the queue manager determining that the reactivated consumer 31 is capable of handling a stream of messages at the first message distribution rate, for example by virtue of the reactivated consumer 31 not returning received messages 61 to the message queue 31, or returning a number of received messages 61 to the message queue 31 below a predefined threshold, the queue manager may increase the first message distribution rate to a second message distribution rate and continue this process until the actual message distribution rate of messages 61 to the reactivated consumer 31 matches the message processing capacity of the consumer 31.

Some consumers 31 may be able to request a plurality of next messages 61 to be processed from the message queue 60, for example application servers hosting a plurality of instances or threads of a particular message processing application that facilitate the parallel processing of a plurality of messages 61 from the message queue 60. For such multi-message consumers, a situation may arise where each of the instances of the message processing applications, i.e. each consumer instance, is capable of accepting new messages 61 from the message queue, but not every consumer instance may be able to successfully process such a new message 61, for example because of bandwidth issues with a remote resource such as a database or the like.

As an example, an application server may host N instances of a consumer 31, with N a positive integer of at least 2, e.g. at least 10, 20, 30, 40 or 50, but an associated resource required for the successful processing of these messages 61 may only facilitate the successful processing of M of such messages at one time, with M being an integer and M<N, for example because of temporary bandwidth problems, e.g. maintenance issues or the like. In such a scenario, a particular multi-message consumer 31 may exhibit unfavorable message processing success characteristics, which may lead to message congestion in the message queue 60 as previously explained.

This may be avoided by the queue manager implementing a throttling process, an example embodiment of which is schematically depicted by the flowchart of FIG. 5. In this embodiment, the queue manager after initiating in 101 may proceed to 151 in which the queue manager maintains a parallel processing metric for a particular multi-message consumer 31. The parallel processing metric for instance may be the total number of messages M successfully processed at one time by the multi-message consumer 31, may be a success ratio M/N, i.e. the fraction of successfully processed messages M over the total number of messages N received at one time by the multi-message consumer 31, or may be any other suitable parallel processing metric.

The queue manager may monitor in 153 if the multi-message consumer 31 has returned a number of messages 61 to the message queue 60, e.g. P messages 61, such that the queue manager may determine the number of successfully processed messages 61 by the multi-message consumer 31 from the formula M=N—P. Alternatively, the queue manager may determine M simply by counting the number of confirmations of successful message processing received from the multi-message consumer 31.

If no messages are returned to the message queue by the multi-message consumer 31, there is no need for the queue manager to throttle the number of messages to be issued to the multi-message consumer 31, in which case the queue manager may proceed to 161 where the queue manager may decide to terminate in 121 or to continue maintaining the parallel processing metric of the respective multi-message consumers 31 in 151.

On the other hand, if the queue manager determines in 153 that the multi-message consumer 31 has returned P messages 61 to the message queue 60, the parallel processing metric for the multi-message consumer 31 may be updated in 155, e.g. by updating M or the ratio M/N.

The queue manager may receive in 157 a further request from the multi-message consumer 31 for N messages to be processed. Based on the determined (updated) parallel processing metric of the multi-message consumer 31, the queue manager may decide in 159 to distribute a further number of next messages 61 to be processed to the multi-message consumer 31, with the further number of Q next messages (Q being an integer larger than 1) to be processed to the multi-message consumer 31 being a fraction of the requested number of next messages to be processed by the multi-message consumer 31. This fraction may be based on the determined success metric of the multi-message consumer 31, i.e. on the parallel processing metric of the multi-message consumer 31.

In an embodiment, this fraction may simply be the previously determined number of M messages 61 successfully processed by the multi-message consumer 31, if the number of Q messages 61 requested by the multi-message consumer 31 in 157 exceeds M. Alternatively, the queue manager may use the ratio M/N as a scaling factor for the number of messages to be distributed to the requesting multi-message consumer 31, wherein the actual number of messages distributed to the multi-message consumer 31 may be (M/N) *Q. In other words, the queue manager may distribute a further number of next messages 61 to be processed to the multi-message consumer 31 by scaling the number of next messages 61 to be processed from the message queue 60 as requested by the multi-message consumer 31 with the ratio M/N to determine the further number of next messages 61 to be distributed to the multi-message consumer 31.

The queue manager may continue to monitor the performance, i.e. parallel processing success rate, of the multi-message consumer 31 and update the success metric, i.e. the parallel processing metric, accordingly, e.g. to reduce or increase throttling of the multi-message consumer 31 in case of improving or deteriorating message processing success rates, with the aim to ultimately return the multi-message consumer 31 to full message handling capacity if possible. To this end, the queue manager may monitor the performance of the multi-message consumer 31 over a defined period of time, calculate a message handling success rate over this period of time and decide to upwardly or downwardly adjust the throttling rate based on the calculated handling success rate. The queue manager may monitor the performance of the multi-message consumer 31 over a (contiguous) plurality of such defined periods of time and assess the message handling success rate of the multi-message consumer 31 after each period to dynamically adjust the throttling rate where necessary. The queue manager may speculatively adjust throttling, e.g. after a set period of time and monitor the parallel processing performance of the multi-message consumer 31 to determine if the speculatively adjusted throttling, e.g. a reduced throttling factor to restore the multi-message consumer 31 has not led to unsatisfactory return rates of messages 61 to the message queue 60. If this is not the case, the adjusted throttling factor may be further adjusted, e.g. further reduced to further increase the parallel processing capacity of the multi-message consumer 31; otherwise, the adjusted throttling factor may be restored to its previous value or to another suitable value in order to counter the detected unsatisfactory message return performance of the multi-message consumer 31.

The present invention may be a (computer) system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer-implemented method of managing distribution of messages from a message queue to a plurality of consumers for processing the messages, the method comprising:

maintaining, by a system comprising a processor arrangement, a processing history for the messages in the message queue, wherein the processing history comprises a mapping table that identifies each message in the message queue by a message identifier and maps, for each given message identifier, a set of consumer identifiers that identify consumers that have previously failed to successfully process a message in the message queue having the given message identifier, wherein each consumer identifier of the set of consumer identifiers in the mapping table identifies a consumer that previously returned the message to the message queue following an unsuccessful processing of the message by the consumer and a rollback of the message, wherein the consumers are hosted by a plurality of computers that are separately located in geographically distinct locations;

maintaining, by the system, a consumer failure counter for each consumer indicating a number of failures by the consumer to successfully process a message from the message queue;

receiving, by the system, a message returned to the message queue by a returning consumer failing to successfully process the returned message;

identifying, by the system, the returning consumer;

increasing, by the system, the consumer failure counter of the returning consumer; and suspending, by the system, a consumer for a period of time if its consumer failure counter reaches a consumer failure threshold value.

2. The computer-implemented method of claim 1, further comprising:

considering, by the system, a suitability of a particular consumer to receive a next message to be processed from the message queue by:

determining, by the system, the message identifier of the next message and the consumer identifier of the particular consumer; and checking, by the system, the set of consumer identifiers for the message identifier of the next message in the processing history to determine if the set of consumer identifiers contains the consumer identifier of the particular consumer; and distributing, by the system, the next message to be processed to the particular consumer if the consumer identifier of the particular consumer is not present in the set of consumer identifiers.

3. The computer-implemented method of claim 2, further comprising:

maintaining a processing failure counter for each message in the message queue and, if the processing failure counter of the next message to be processed from the message queue meets a predefined message processing failure threshold, performing:
- checking the set of consumer identifiers for the message identifier of the next message in the processing history to determine if the checked set of consumer identifiers contains the determined consumer identifier of the particular consumer; and
- distributing the next message to be processed to the particular consumer if the consumer identifier of the particular consumer is not present in the checked set of consumer identifiers.

4. The computer-implemented method of claim 2, wherein the message identifier is one of a message type identifier and an individual message identifier.

5. The computer-implemented method of claim 2, comprising:
- receiving respective requests from a plurality of particular consumers to receive a next message to be processed from the message queue;
- determining the respective consumer identifiers of the particular consumers; and
- checking the set of consumer identifiers for the message identifier of the next message in the processing history for each of the determined consumer identifiers to determine if the set of consumer identifiers contains the determined consumer identifier until a first particular consumer identifier is determined that is not present in the set of consumers identifiers of the next message in the processing history; and
- distributing the next message to be processed to the consumer associated with the first particular consumer identifier.

6. The computer-implemented method of claim 5, wherein checking the set of consumer identifiers for the message identifier of the next message in the processing history for each of the determined consumer identifiers to determine if the set of consumer identifiers contains the determined consumer identifier is performed in a round-robin fashion.

7. The computer-implemented method of claim 2, wherein a consumer is a multi-message consumer adapted to process a number of messages in parallel, the method comprising:
- monitoring the parallel processing of the number of messages by the multi-message consumer;
- determining a success metric indicative of the number of messages successfully processed by the multi-message consumer;
- receiving a request from the multi-message consumer to receive the number of next messages to be processed from the message queue; and
- distributing a further number of next messages to be processed to the multi-message consumer, the further number of next messages to be processed to the multi-message consumer being a fraction of the requested number of next messages to be processed by the multi-message consumer, the fraction being based on the determined success metric.

8. The computer-implemented method of claim 7, wherein the success metric defines a total number of messages successfully processed in parallel by the multi-message consumer, and the distributing a further number of next messages to be processed to the multi-message consumer comprises distributing a further number of next messages to the multi-message consumer equaling the total number of messages successfully processed in parallel by the multi-message consumer if the requested number of next messages to be processed by the multi-message consumer exceeds the total number.

9. The computer-implemented method of claim 7, wherein the success metric defines a ratio between a first number of messages processed in parallel by the multi-message consumer and a second number of messages from the first number of messages successfully processed by the multi-message consumer, and the distributing a further number of next messages to be processed to the multi-message consumer comprises scaling the number of next messages to be processed from the message queue requested by the multi-message consumer with the ratio to determine the further number of next messages to be distributed to the multi-message consumer.

10. The computer-implemented method of claim 2, wherein the processing history is distributed over the messages in the queue such that each message comprises a message identifier and a set of consumer identifiers associated with the message identifier.

11. The computer-implemented method of claim 2, further comprising:
- receiving a communication from a consumer indicating a successful processing of a message received from the message queue; and
- updating the processing history for the messages in the message queue by removing the message identifier and associated set of consumer identifiers of the successfully processed message from the processing history.

12. The computer-implemented method of claim 1, further comprising reactivating a consumer after the period of time.

13. The computer-implemented method of claim 12, further comprising:
- distributing a next message from the message queue to the reactivated consumer; and
- suspending the reactivated consumer for a further period of time if the reactivated consumer fails to successfully process the next message from the message queue, the further period of time exceeding the period of time.

14. The computer-implemented method of claim 13, wherein the further period of time is a multiple of the period of time.

15. The computer-implemented method of claim 13, further comprising:
- distributing a plurality of messages from the message queue to the reactivated consumer at a first message distribution rate; and
- increasing the first message distribution rate of messages from the message queue to the reactivated consumer upon successful processing of the plurality of messages by the reactivated consumer.

16. The computer-implemented method of claim 1, further comprising resetting the consumer failure counter of a consumer upon the consumer associated with the consumer failure counter successfully processing a message from the message queue.

17. A computer program product comprising a computer readable storage medium having computer readable program instructions embodied therewith for, when executed on a computer system comprising a processor arrangement adapted to execute the computer readable program instructions, cause the processor arrangement to:
- maintain a processing history for the messages in the message queue, wherein the processing history comprises a mapping table that identifies each message in the message queue by a message identifier and maps, for each given message identifier, a set of consumer identifiers that identify consumers that have previously failed to successfully process a message in the message queue having the given message identifier, wherein each consumer identifier of the set of consumer identifiers in the mapping table identifies a consumer that previously returned the message to the message queue following an unsuccessful processing of the message by the consumer and a rollback of the message, wherein the consumers are hosted by a plurality of computers that are separately located in geographically distinct locations;

maintain a consumer failure counter for each consumer indicating a number of failures by the consumer to successfully process a message from the message queue;

receive a message returned to the message queue by a returning consumer failing to successfully process the returned message;

identify the returning consumer;

increase the consumer failure counter of the returning consumer; and suspend a consumer for a period of time if its consumer failure counter reaches a consumer failure threshold value.

18. A computer system for managing distribution of messages from a message queue to a plurality of consumers for processing the messages, the computer system comprising a processor configured to:

maintain a processing history for the messages in the message queue, wherein the processing history comprises a mapping table that identifies each message in the message queue by a message identifier and maps, for each given message identifier, a set of consumer identifiers that identify consumers that have previously failed to successfully process a message in the message queue having the given message identifier, wherein each consumer identifier of the set of consumer identifiers in the mapping table identifies a consumer that previously returned the message to the message queue following an unsuccessful processing of the message by the consumer and a rollback of the message, wherein the consumers are hosted by a plurality of computers that are separately located in geographically distinct locations;

maintain a consumer failure counter for each consumer indicating a number of failures by the consumer to successfully process a message from the message queue;

receive a message returned to the message queue by a returning consumer failing to successfully process the returned message;

identify the returning consumer;

increase the consumer failure counter of the returning consumer; and suspend a consumer for a period of time if its consumer failure counter reaches a consumer failure threshold value.

19. The computer system of claim 18, wherein the processor is further configured to:

reactivate a consumer after the period of time;

distribute a next message from the message queue to the reactivated consumer; and suspend the reactivated consumer for a further period of time if the reactivated consumer fails to successfully process the next message from the message queue, the further period of time exceeding the period of time.

20. The computer system of claim 19, wherein the processor is further configured to:

distribute a plurality of messages from the message queue to the reactivated consumer at a first message distribution rate; and increase the first message distribution rate of messages from the message queue to the reactivated consumer upon successful processing of the plurality of messages by the reactivated consumer.

* * * * *